(12) United States Patent
Dzurilla

(10) Patent No.: US 6,995,317 B1
(45) Date of Patent: Feb. 7, 2006

(54) DOUBLE WIRE PASS THROUGH SEAL WITH GROMMETS

(75) Inventor: John Joseph Dzurilla, Parma Heights, OH (US)

(73) Assignee: Excello Engineered Systems, LLC, Cleveland, OH (US)

( * ) Notice: Subject to any disclaimer, the term of this patent is extended or adjusted under 35 U.S.C. 154(b) by 0 days.

(21) Appl. No.: 11/076,287

(22) Filed: Mar. 9, 2005

Related U.S. Application Data

(60) Provisional application No. 60/552,658, filed on Mar. 11, 2004.

(51) Int. Cl.
*H02G 3/18* (2006.01)

(52) U.S. Cl. .............. 174/65 G; 174/152 G; 174/153 G; 246/56; 16/2.1; 16/2.2

(58) Field of Classification Search .......... 174/65 G, 174/65 R, 135, 151, 152 R, 152 G, 153 G, 174/142; 248/56; 16/2.1, 2.2

See application file for complete search history.

(56) References Cited

U.S. PATENT DOCUMENTS

| | | | |
|---|---|---|---|
| 4,234,218 A * | 11/1980 | Rogers ............... | 174/153 G |
| 4,696,848 A | 9/1987 | Jones et al. | |
| 4,957,803 A | 9/1990 | Foley | |
| 5,736,677 A * | 4/1998 | Sato et al. .............. | 174/152 G |
| 5,739,475 A * | 4/1998 | Fujisawa et al. ........ | 174/153 G |
| 5,856,635 A * | 1/1999 | Fujisawa et al. ........ | 174/153 G |
| 6,081,964 A * | 7/2000 | Mori ...................... | 174/153 G |
| 6,303,869 B1 * | 10/2001 | Shanahan et al. ....... | 174/153 G |
| 6,372,986 B1 * | 4/2002 | Saeki et al. .............. | 174/65 G |
| 6,442,794 B2 * | 9/2002 | Uchida et al. .......... | 174/153 G |
| 6,600,105 B2 * | 7/2003 | Nakata et al. ............ | 174/65 G |
| 6,632,999 B2 * | 10/2003 | Sempliner et al. ........ | 174/65 G |
| 6,737,583 B2 * | 5/2004 | Saeki et al. .............. | 174/65 G |
| 6,825,416 B2 * | 11/2004 | Okuhara ................... | 174/65 G |
| 2004/0069521 A1 | 4/2004 | Shimola et al. | |

* cited by examiner

*Primary Examiner*—Angel R. Estrada
(74) *Attorney, Agent, or Firm*—Fay, Sharpe, Fagan, Minnich & McKee, LLP

(57) ABSTRACT

A double wire seal has a first grommet for sealing a conductor relative to a substrate having opposite sides and an opening therethrough for a conductor. The first grommet has axially opposite ends. A second grommet for sealing the conductor relative to a door panel having opposite ends and an opening therethrough for the conductor. The second grommet has axially opposite ends. The first grommet secures the conductor to the substrate. The second grommet secures the conductor to the door panel.

32 Claims, 2 Drawing Sheets

DOUBLE WIRE PASS THROUGH SEAL WITH GROMMETS

CLAIM OF PRIORITY

This application claims priority from U.S. Provisional Patent Application Ser. No. 60/552,658, filed on Mar. 11, 2004.

BACKGROUND OF THE INVENTION

This invention relates to the art of seals and, more particularly, to multiple grommets for sealing electrical conductors or cables extending through an opening in a door panel and through an opening between wet and dry sides of a substrate such as a watershield component.

The present invention finds particular utility in connection with sealing electrical wires in a wiring harness extending through a watershield mounted on the inner panel of a vehicle door. Accordingly, the invention will be illustrated and described in detail herein in connection with such use. At the same time, as will become apparent hereinafter, it will be appreciated that the invention is applicable to the sealing of wires or cables relative to the opposite sides of other substrates such as panels, plate components, or the fire wall of a vehicle, for example.

It is known, as shown in commonly assigned prior U.S. Pat. Nos. 4,696,848 and 4,957,803, and Published Application No. U.S. 2004/0069521, published on Apr. 15, 2004 to provide surface protectors or watershields on the inner panels of vehicle doors to protect the inner panels against the infiltration of water, dirt, dust, air, or the like. Generally, the shields are in the form of thin, flexible sheets of plastic material, such as polyethylene, having a peripheral contour generally corresponding to that of an inner door panel of a given vehicle. The shields are joined to the door panels such as by pressure sensitive adhesive or other suitable fastening arrangements and, in vehicles having powered equipment such as windows, door locks, rear view mirrors, and the like, the electrical wires or wiring harnesses for such equipment pass through the watershield. As such, the conductors need to be sealed relative to the opening therefor in the watershield so as to preclude the ingress of air, water and dirt from the so-called wet to the dry side of the shield. Heretofore, the opening for the conductors has been provided by cutting slits through the shield or, as shown in the above-mentioned U.S. Pat. No. 4,957,803 by providing a pocket comprising a plurality of closely spaced corrugations extending about a central opening through which a conductor extends. A portion or portions of the corrugations adjacent the opening are adhesively bonded to the conductor to optimize sealing therebetween.

The mere provision of slits in the shield for wires makes sealing across the shield extremely difficult, whereby the ingress of air, water and dirt across the shield remains a problem. While adequate sealing is achieved with the corrugated pocket arrangement described above, desired positioning of the conductor ends relative to the opposite sides of the shield is difficult to achieve because of the presence of the adhesive about the opening through which the conductors are passed. Further, if it becomes necessary to remove and replace the wires, the adhesive bonding between the pocket and wires resists separation thereof, making such removal difficult and, possibly, resulting in damage to the shield. Still further, if there is an electrical connector on an end of the wires which is diametrically larger than the conductors, assembly of the wires with the shield becomes difficult and sometimes impossible in that the connector cannot pass through the opening provided for the wires and, if the latter is enlarged such as by cutting, then sealing of the enlarged pocket opening with the wires can be a problem.

Another sealing arrangement includes a grommet which can be preassembled with a wiring harness and positioned relative to a connector on an end of the harness. When the shield is installed on a vehicle door panel, the grommet is positioned for sealing engagement with the shield. Currently, multiple clips, such as plastic clips, are used to attach the wire harness to the sheet metal door panel. Clips can break and be difficult to install, and cause the wire to be routed along the sheet metal in areas convenient to install clips.

Thus, there is a need to provide an additional grommet and flange to the sheet metal door panel for an existing wire seal to eliminate the necessity for special clips to secure the wire harness to the door panel. One grommet will attach the wire harness to the panel and then another grommet will seal the wire harness to the watershield.

SUMMARY OF THE INVENTION

In accordance with the present invention, a sealing arrangement for conductors extending through an opening between opposed sides of a substrate such as a watershield component includes grommets by which the foregoing and other disadvantages encountered in connection with prior art devices and techniques are advantageously minimized or overcome. In particular in this respect, a sealing arrangement in accordance with the present invention includes a first grommet which secures the wire harness to the sheet metal inner door panel and a second grommet which secures the wire harness to the watershield. Each grommet can be preassembled with the wiring harness and positioned relative to a connector on the end of the harness so that when the shield is installed in a vehicle door panel, the grommets are accurately positioned for sealing engagement with the panel and the shield.

Advantageously, each grommet provides for the wiring harness to have an enlarged electrical connector on one end thereof for passing through the opening in the door panel and shield while, at the same time, providing for sealing interengagement between one of the grommets and the door panel or shield in connection with the mounting of the wiring harness and grommets on the door panel or shield. This advantageously enables the shield to be mounted on a door panel prior to completing the interconnection between the grommet and shield. This is achieved by pushing or pulling the electrical connector and corresponding end of the wiring harness through the opening from one toward the other side of the shield, and then pulling the grommet into sealing interengagement with the shield. The other grommet is then pulled into sealing interengagement with the door panel.

In accordance with one aspect of the invention, a double wire seal has a first grommet for sealing a conductor relative to a substrate having opposite sides and an opening therethrough for a conductor. The first grommet has axially opposite ends. One of the first grommet ends comprises a tubular section, and the other of the first grommet ends has a flange. The first grommet secures the conductor to the substrate.

A second grommet seals the conductor relative to a door panel having opposite ends and an opening therethrough for the conductor. The second grommet has axially opposite ends, wherein one of the ends comprises a tubular section and the other of the ends comprises a flange. The second grommet secures the conductor to the door panel.

In accordance with another aspect of the invention, a method of sealing a conductor having a connector to a substrate having opposite ends and an opening therethrough and a door panel having opposite ends and an opening therethrough includes the steps of: providing a first grommet having a first end for sealingly engaging the conductor and a second end larger than the opening of the door panel; mounting the first grommet on the conductor with the first end facing the conductor; inserting the connector and conductor through the door panel opening from one side of the door panel sealing the second end of the first grommet to the door panel; providing a second grommet having a first end for sealingly engaging the conductor and a second end larger than the opening of the substrate; mounting the second grommet on the conductor with the first end of the second grommet facing the conductor; inserting the connector and conductor through the substrate opening from one side of the substrate; and sealing the second end of the second grommet to the substrate.

In accordance with another aspect of the invention, the grommets, which are of a resilient material, provide rigidity for the support of the wires relative to that afforded by a plurality of pocket corrugations while, at the same time, enabling both axial and lateral displacement of the wires relative to the shield and door panel. This facilitates both the installation of the wires and the displacement of the wires relative to the shield and door panel as may be necessary to accommodate the wires in the door panel. Still further, a conductor mounting and sealing arrangement in accordance with the invention advantageously facilitates the easy removal and/or replacement of the wiring harness without damaging the shield should such removal or replacement become necessary.

It is accordingly an object of the present invention to provide an improved sealing arrangement in connection with the mounting of electrical conductors in an opening through a substrate such as a watershield component exposed to different environmental conditions on the opposite sides thereof.

Another object is the provision of a sealing arrangement of the foregoing character which includes grommets which facilitate the mounting of electrical conductors having an enlarged electrical connector on one end thereof relative to a shield component and a door panel each having an opening therethrough at least as large as that of the electrical connector.

Still another object is the provision of grommets which facilitate stabilizing the electrical wires relative to the shield and panel while still allowing for axial and lateral displacement of the wires.

Another object is a provision of a grommet of the foregoing character which enables the sealing interengagement between electrical wires, a wiring harness, or the like and a shield component to be achieved quicker and more efficiently than heretofore possible while optimizing the obtaining and maintaining of a desired sealed relationship between the wires and the opposite sides of the shield.

Yet another object is the provision of a second grommet and flange for securing the wire harness to the inner door panel to thus eliminate the need for special or extra clips to attach the harness to the door panel.

BRIEF DESCRIPTION OF THE DRAWINGS

The foregoing objects and others will in part be obvious and in part pointed out more fully hereinafter in conjunction with the written description of preferred embodiments of the invention illustrated in the accompanying drawings, in which.

DESCRIPTION OF PREFERRED EMBODIMENTS

Figure 1:
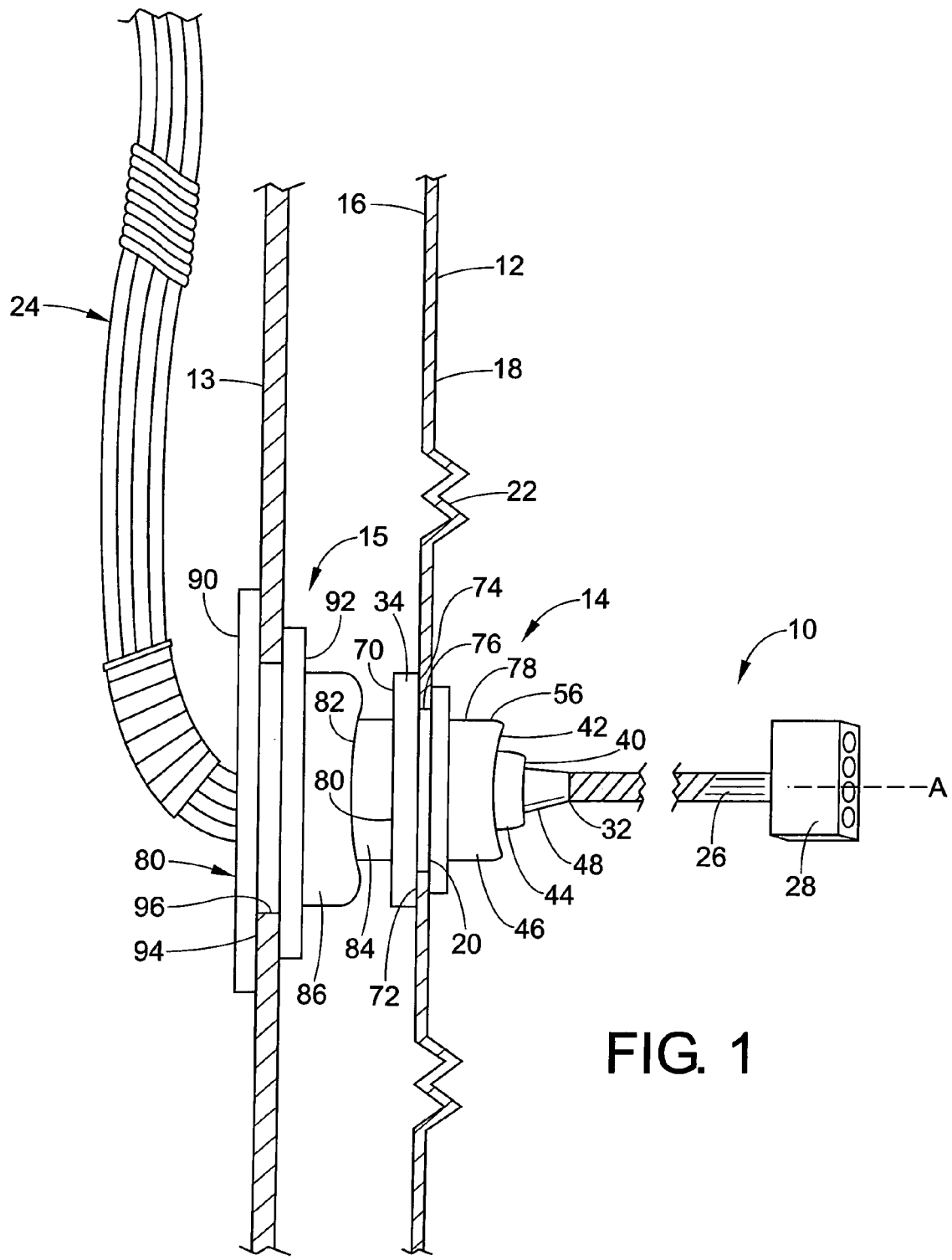
FIG. 1 is a side elevation view of a double grommet formed according to the invention and showing the grommets sealingly mounting a wiring harness relative to a watershield and door panel.
Figure 3:
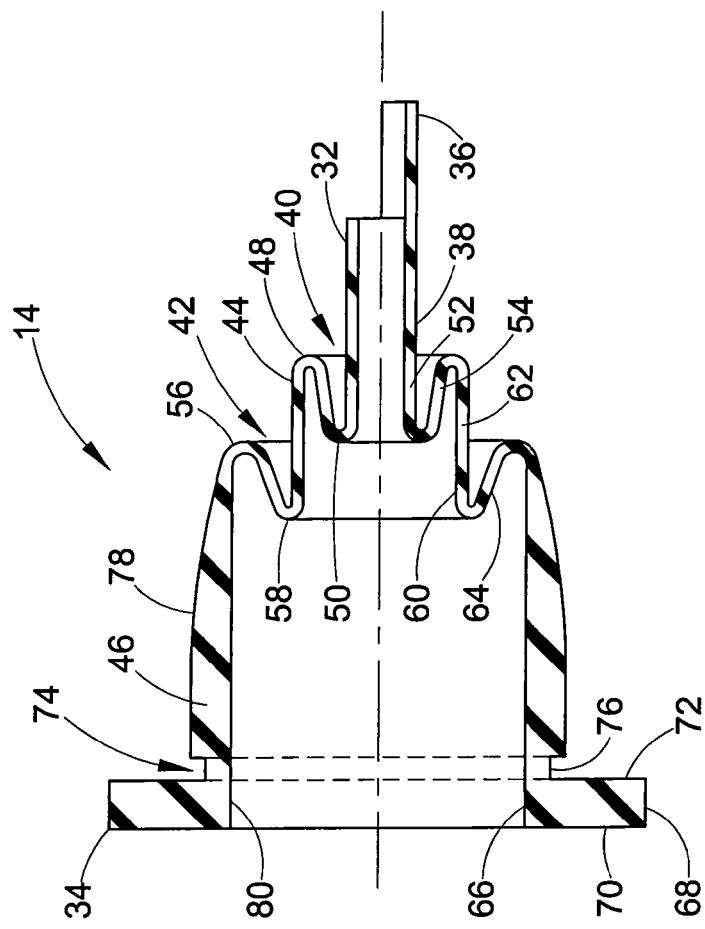
FIG. 3 is a sectional elevation view of the watershield grommet taken along line 3—3 in FIG. 2.
Figure 2:
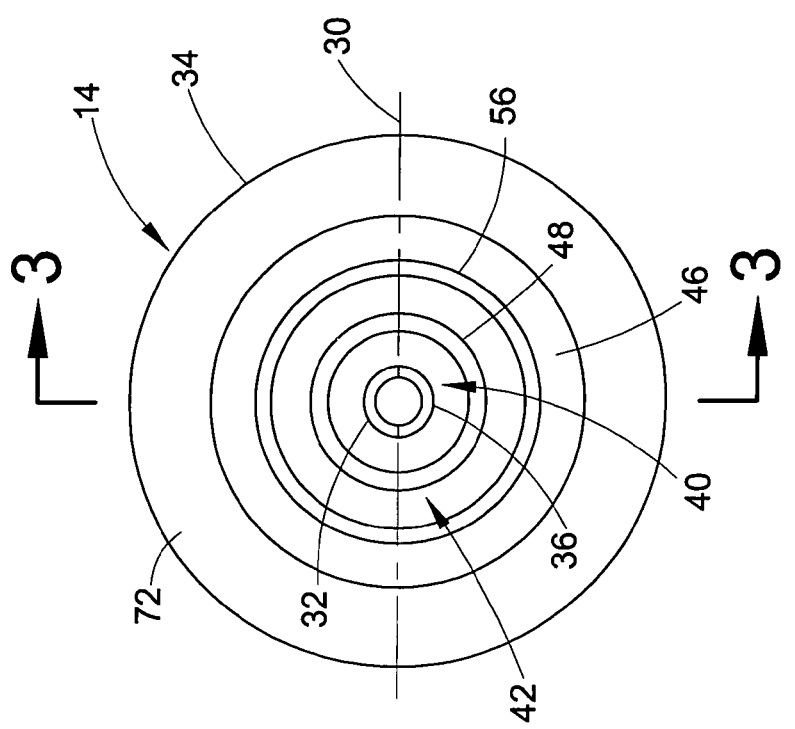
FIG. 2 is a front elevation view of the watershield grommet shown in FIG. 1.

Referring now in greater detail to the drawings, wherein the showings are for the purpose of illustrating preferred embodiments of the invention only, and not for the purpose of limiting the invention, FIG. 1 illustrates a wiring harness 10 mounted on a watershiefd 12 and sheet metal inner door panel 13 by means of a first grommet 14 and a second grommet 15. Grommet 14 is also shown in FIGS. 2 and 3 of the drawings. Watershield 12 is of a suitable plastic material, such as polyethylene, and has opposed sides or faces 16 and 18, respectively. The shield is provided with an opening 20 having an axis A and, preferably but not necessarily, the opening is surrounded by a plurality of corrugations 22 similar to those described in the aforementioned patents and which provide added flexibility for the wiring harness mounting.

Wiring harness 10 comprises a plurality of electrical conductors 24 wrapped in electrical tape 26 and having an electrical connector 28 on the end thereof which is on the side 18 of the shield. It will be appreciated that connector 28 can be a male, female or combined connector for electrically connecting the wiring harness with a mating connector in the electrical system of the vehicle.

First grommet 14 and second grommet 15 are both tubular and preferably cylindrical, and are each made of a suitable resilient material such as rubber or an artificial rubber such as neoprene. The internal configuration of both grommets is substantially similar. Thus, for convenience, only the interior of the first grommet 14 will be described in detail.

Referring now to FIGS. 2 and 3, grommet 14 has an axis 30 which is coaxial with axis A when the grommet is mounted on shield 12, and the grommet includes axially opposite first and second ends respectively in the form of a tube 32 and a flange 34. End 32 is of a diameter for receiving and tightly interengaging with wiring harness 10 and has a semi-circular finger tab 36 extending axially outward therefrom and an inner end 38. The grommet includes a wall between ends 32 and 34 comprising first and second re-entrant wall portions 40 and 42, respectively, which face end 32, a first connecting wall portion 44 between the re-entrant wall portions, and a second connecting wall portion 46 between second re-entrant wall portion 42 and end 34 of the grommet. Re-entrant wall portion 40 has axially outer and inner ends 48 and 50, respectively, and is defined by a radially inner wall 52 extending from inner end 38 of end portion 32 and a radially outer wall 54 connected to the axially outer end of connecting wall portion 44. Second re-entrant wall portion 42 has axially outer and inner ends 56 and 58, respectively, and is defined by a radially inner wall 60 extending from the inner end 62 of connecting wall portion 44 and a radially outer wall portion 64 connected to the axially outer end of connecting wall portion 46.

As will be appreciated from FIG. 3, end 32 of the grommet, the radially inner and outer walls of the re-entrant wall portions and connecting wall portions 44 and 46 are coaxial with and generally parallel to axis 30 of the grommet. As will be further appreciated from FIG. 3, the second re-entrant wall portion 42 is radially outward of first reentrant wall portion 40 and axially offset therefrom in the direction from end 32 towards end 34 of the grommet. Moreover, the radially inner and outer walls of the two re-entrant wall portions and end 32 of the grommet are of the same radial thickness while wall 46 has a radial thickness at end 32 which is several times greater than that of the walls of the re-entrant wall portions and end 32. Furthermore, connecting wall portion 46 has radially outer and inner surfaces 78 and 80, respectively, which converge relative to axis 30 in the direction from end 34 toward end 32 of the grommet, and outer surface 78 converges relative to inner surface 80 in the latter direction for the connecting wall portion to have a radial thickness at end 56 of re-entrant wall portion 42 corresponding to that of radially outer wall 64 of the re-entrant wall portion. Connecting wall portion 46 provides rigidity and stability for the grommet relative to shield 12 when the grommet is mounted thereon, and end 32 and re-entrant wall portions 40 and 42 provide for the wiring harness to be axially and laterally displaceable relative to wall portion 46 and the shield.

Flange 34 providing the second end of the grommet is a radially outward extending peripheral flange having radially inner and outer peripheral surfaces 66 and 68, respectively, and axially outer and inner planar faces 70 and 72, respectively. Surfaces 66 and 68 are respectively diametrically smaller and larger than the diameter of opening 20 in shield 12 and, in the embodiment illustrated in FIGS. 1–3, connecting wall portion 46 is provided with a radially inward extending peripheral recess 74 adjacent interface 72 of the flange. As will be appreciated from FIG. 1, recess 74 is adapted to sealingly interengage with the peripheral edge of opening 20 in shield 12 and, for this purpose, the recess includes a bottom wall 76 for engaging with the peripheral edge of the opening.

Referring to FIG. 1, grommet 15 also has re-entrant wall portions 80, 82, a first connecting wall portion 84 between the re-entrant wall portions, and a second connecting wall portion 86 between second re-entrant wall portion 82 and a flange 88.

Connecting wall portion 86 provides rigidity and stability for the grommet relative to panel 13 when the grommet is mounted thereon, and re-entrant wall portions 80, 82 provide for the wiring harness to be axially and laterally displaceable relative to wall 86 and the panel.

Flange 88 has axially outer and inner planar faces 90 and 92, respectively. A recess 94 intermediate faces 90, 92 is adapted to sealingly interengage with the peripheral edge of opening 96 in the door panel 13.

Grommet 15 is shown to be interconnected to grommet 14 via first connecting wall portion 84 at flange 34 inner planar face 70. However, the grommets could be positioned adjacent each other without being physically connected.

In use, as will be appreciated from the drawings and the description herein, an operator installs the wire harness to a door panel by passing the wire through hole 96 in the sheet metal panel, and then pulls the double wire grommet through the hole until it is sealed by the second grommet recess 94 of flange 88. The wire harness is then passed through the hole in the watershield and pulled until the first grommet 14 is sealed to the watershield. Grommets 14 and 15 are mounted onto wiring harness 10, such as at the time of manufacture, and are located on the harness so as to be in the correct location for connection with the respective substrate component on which they are to be mounted which, in the illustrated embodiment, are watershield 12 and vehicle door inner panel 13. When the watershield has been so mounted, the installer accesses the connector 28 by reaching through to the side 16 of the watershield, pulls the latter and the wiring harness through the opening toward the other side 18 of the shield and then grasps and pulls grommet 14 outwardly of side 18 for the peripheral edge of opening 20 to engage in the grommet recess with face 72 of flange 34 of the grommet engaging against the side 16 of the shield.

In addition to, or as an alternative to sealingly interengaging the grommet 14 and shield 12 through the use of a recess in the grommet, the planar side 72 of flange 34, or the side 16 of the shield adjacent the periphery of opening 20 may be provided with an adhesive for sealingly bonding the grommet in place. It will be appreciated, of course, that if an adhesive sealing and bonding mounting is to be used, it would not be necessary for grommet 14 to have recess 74 therein. It will be further appreciated that if the mounting arrangement is through the use of a recess in the outer surface of the grommet, or a recess defined by a second flange on the outer surface, the outer diameter of flange 34 can be equal to and preferably slightly larger than the diameter of outer surface 78 of the grommet at the end thereof adjacent the flange. A diameter larger than that of surface 78 is preferred to optimize the resistance against pulling the grommet through opening 20 during the installation process. It will be appreciated that these dimensional variations will depend at least in part on the material of the watershield or other component onto which the grommet is to be mounted and the thickness thereof about the mounting opening.

Similarly, as an alternative to sealingly interengaging the grommet 15 and panel 13 through the use of a recess 94 in the grommet, the planar side 92 of flange 88 can be provided with an adhesive for sealingly bonding the grommet into place.

While considerable emphasis has been placed herein on preferred embodiments of the invention, it will be appreciated that other embodiments can be made and that modifications can be made to the preferred embodiments without departing from the principals of the invention. In particular in this respect, it will be appreciated that the grommets may include one, or more than two, re-entrant wall portions between the opposite ends thereof. The foregoing and other modifications will be obvious or suggested to others upon a reading and understanding of the disclosure herein, whereby it is to be distinctly understood that the foregoing descriptive matter is to be interpreted merely as illustrative of the invention and not as a limitation.

What is claimed is:

1. A double wire seal comprising:
   a first grommet for sealing a conductor relative to a substrate having opposite sides and an opening therethrough for a conductor, said first grommet having axially opposite ends;
   a second grommet for sealing said conductor relative to a door panel having opposite ends and an opening therethrough for said conductor, said second grommet having axially opposite ends;
   wherein said first grommet secures said conductor to said substrate;

wherein said second grommet secures said conductor to said door panel;

wherein one of said first grommet ends comprises a tubular section and the other of said first grommet ends comprises a flange; and wherein said first grommet comprises a wall located between said first grommet one end and said first grommet other end having at least one re-entrant wall therein.

2. The double wire seal of claim 1, wherein said first grommet further comprises a semi-circular tab extending axially outwardly from said tubular section.

3. The double wire seal of claim 1, wherein said first grommet comprises a second re-entrant wall located between said first grommet one end and said first grommet other end.

4. The double wire seal of claim 3, wherein said second re-entrant wall portion of said first grommet is positioned radially outward of said first re-entrant wall portion of said first grommet.

5. The double wire seal of claim 3, wherein said first grommet second re-entrant wall portion is radially outwardly of said first grommet first re-entrant wall portion and is axially offset therefrom in the direction toward said first grommet other end.

6. The double wire seal of claim 3, wherein said wall of said first grommet comprises a connecting wall portion extending from said first grommet other end toward said first grommet one end, said connecting wall portion having a radial thickness greater than that of at least one of said first and second re-entrant wall portions.

7. The double wire seal of claim 6, wherein said first grommet one end has an axially inner end and said first re-entrant wall portion is positioned adjacent said inner end, said second re-entrant wall portion is radially outwardly of said first re-entrant wall portion and axially offset therefrom in the direction toward said first grommet other end, and said connecting wall portion extends from said second re-entrant wall portion toward said first grommet other end.

8. The double wire seal of claim 6, wherein said connection wall has a radial thickness greater than a radial thickness of said first and second re-entrant wall portions of said first grommet.

9. The double wire seal of claim 8, wherein said connecting wall has radially outer and inner surfaces which converge from said first grommet one end towards said first grommet other end.

10. The double wire seal of claim 9, wherein said outer surface of said connecting wall converges relative to said inner surface so that said connecting wall has a radial thickness corresponding to a radial thickness of a radially outer wall of said second re-entrant wall portion of said first grommet.

11. The double wire seal of claim 6, wherein said connecting wall portion comprises a radially inward extending peripheral recess adjacent said flange of said first grommet.

12. The double wire seal of claim 11, wherein said recess sealingly interengages with an opening in said substrate.

13. The double wire seal of claim 6, wherein said second grommet is connected to said first grommet via said connecting wall portion adjacent an inner planar face of said flange of said first grommet.

14. The double wire seal of claim 1, wherein one of said second grommet ends comprises a tubular section and the other of said second grommet ends comprises a flange.

15. The double wire seal of claim 14, wherein said flange of said second grommet comprises a radially extending peripheral flange having radially inner and outer peripheral surfaces and axially outer and inner planar faces.

16. The double wire seal of claim 1, wherein said first grommet first re-entrant wall portion has axially outer and inner ends, and a radially inner wall extending from said inner end and a radially outer wall extending from said outer end.

17. The double wire seal of claim 1, wherein said flange of said first grommet comprises a radially extending peripheral flange having radially inner and outer peripheral surfaces and axially outer and inner planar faces.

18. The double wire seal of claim 1, wherein said first grommet is sealed to said substrate via an adhesive.

19. The double wire seal of claim 1, wherein said second grommet is sealed to said door panel via an adhesive.

20. A double wire seal comprising:

a first grommet for sealing a conductor relative to a substrate having opposite sides and an opening therethrough for a conductor, said first grommet having axially opposite ends;

a second grommet for sealing said conductor relative to a door panel having opposite ends and an opening therethrough for said conductor, said second grommet having axially opposite ends;

wherein said first grommet secures said conductor to said substrate;

wherein said second grommet secures said conductor to said door panel; and, wherein said second grommet comprises a wall located between said second grommet one end and said second grommet other end having at least one re-entrant wall therein.

21. The double wire seal of claim 20, wherein said second grommet comprises a second re-entrant wall located between said second grommet one end and said second grommet other end.

22. The double wire seal of claim 21, wherein said second grommet second re-entrant wall portion is radially outwardly of said second grommet first re-entrant wall portion and is axially offset therefrom in the direction toward said second grommet other end.

23. The double wire seal of claim 20, wherein said second grommet re-entrant wall portion has axially outer and inner ends, and a radially inner wall extending from said inner end and a radially outer wall extending from said outer end.

24. A method of sealing a conductor having a connector to a substrate having opposite ends and an opening therethrough and a door panel having opposite ends and an opening therethrough comprising the steps of:

providing a first grommet having a first end for sealingly engaging the conductor, a second end larger than the opening of said door panel, and a wall located between said first end and said second end having a re-entrant wall there between;

mounting the first grommet on the conductor with said first end facing the conductor;

inserting the connector and conductor through the door panel opening from one side of the door panel sealing the second end of the first grommet to the door panel;

providing a second grommet having a first end for sealingly engaging the conductor and a second end larger than the opening of said substrate;

mounting the second grommet on the conductor with said first end of said second grommet facing the conductor;

inserting the connector and conductor through the substrate opening from one side of the substrate; and sealing the second end of the second grommet to the substrate.

25. The method of claim 24, wherein said second end of said first grommet includes a flange and said sealing includes the step of adhesively bonding said flange to said one side of said door panel.

26. The method of claim 25, wherein said adhesively bonding includes the steps of applying an adhesive to said one side of said door panel and pulling said first grommet in the direction to engage said first grommet flange with said adhesive.

27. The method of claim 25, wherein said adhesively bonding includes the steps of applying adhesive to said first grommet flange and pulling said first grommet in the direction for said adhesive to engage said one side of said door panel.

28. The method of claim 26, further including the step of positioning the first grommet by pulling said first grommet outwardly relative to the other side of said door panel.

29. The method of claim 24, wherein said second end of said second grommet includes a flange and said sealing includes the step of adhesively bonding said flange to said one side of said substrate.

30. The method of claim 29, wherein said adhesively bonding said second grommet includes the steps of applying an adhesive to said one side of said substrate and pulling said second grommet in the direction to engage said second grommet flange with said adhesive.

31. The method of claim 29, wherein said adhesively bonding includes the steps of applying adhesive to said flange of said second grommet and pulling said second grommet in the direction for said adhesive to engage said one side of said substrate.

32. The method of claim 31, further including the step of positioning the second grommet by pulling said second grommet outwardly relative to the other side of said substrate.

* * * * *